(12) United States Patent
Müller (10) Patent No.: US 12,337,676 B2
(45) Date of Patent: Jun. 24, 2025

(54) AIR GUIDE CONTROL

(71) Applicant: Montaplast GmbH, Morsbach (DE)

(72) Inventor: Johannes Müller, Waldbröl (DE)

(73) Assignee: MONTAPLAST GMBH, Morsbach (DE)

( * ) Notice: Subject to any disclaimer, the term of this patent is extended or adjusted under 35 U.S.C. 154(b) by 224 days.

(21) Appl. No.: 18/039,089

(22) PCT Filed: Nov. 26, 2021

(86) PCT No.: PCT/EP2021/083099
§ 371 (c)(1),
(2) Date: May 26, 2023

(87) PCT Pub. No.: WO2022/112471
PCT Pub. Date: Jun. 2, 2022

(65) Prior Publication Data
US 2023/0415564 A1    Dec. 28, 2023

(30) Foreign Application Priority Data

Nov. 27, 2020  (DE) .................... 10 2020 131 530.9
Mar. 18, 2021  (DE) .................... 20 2021 101 381.8

(51) Int. Cl.
*B60K 11/08*   (2006.01)
*B60K 11/04*   (2006.01)

(52) U.S. Cl.
CPC ................................ *B60K 11/085* (2013.01)

(58) Field of Classification Search
CPC ........ B60K 11/08; B60K 11/085; B60K 11/04

USPC ............................. 165/98; 415/146; 137/601
See application file for complete search history.

(56) References Cited

U.S. PATENT DOCUMENTS

| 1,576,507 | A | * | 3/1926 | Eliasek | B60K 11/085 |
| | | | | | 165/135 |
| 3,854,459 | A | * | 12/1974 | Stimeling | F01P 7/10 |
| | | | | | 123/41.04 |
| 4,655,122 | A | * | 4/1987 | McCabe | F24F 13/15 |
| | | | | | 454/259 |
| 4,753,288 | A | * | 6/1988 | Harvey | F01P 7/10 |
| | | | | | 123/41.58 |

(Continued)

FOREIGN PATENT DOCUMENTS

| DE | 102016224846 A1 * | 6/2018 |
| DE | 102018131448 A1 * | 5/2020 |

OTHER PUBLICATIONS

Int'l Search Report mailed Mar. 21, 2022 in Int'l Application No. PCT/EP2021/083099.

(Continued)

*Primary Examiner* — Claire E Rojohn, III
(74) *Attorney, Agent, or Firm* — Panitch Schwarze Belisario & Nadel LLP (57) ABSTRACT

The disclosure relates to an air guide control system with a flap arrangement including flaps which can be rotatably inserted into a joining partner. An actuator drives a damper and a coupling rod transmits the torque of this driven damper to the remaining dampers of the damper arrangement. In the event of a flap fracture of at least one flap, a spring, locks the flap arrangement against further movement, so that error information is reported to the actuator via the coupling rod.

17 Claims, 6 Drawing Sheets

(56) References Cited

U.S. PATENT DOCUMENTS

| | | | | |
|---|---|---|---|---|
| 5,141,026 | A * | 8/1992 | Collette | F01P 7/10 251/229 |
| 6,039,533 | A * | 3/2000 | McCabe | F04D 29/384 416/223 R |
| 6,190,122 | B1 * | 2/2001 | McCabe | F04D 29/384 416/223 R |
| 6,454,528 | B2 * | 9/2002 | McCabe | F03D 9/28 454/351 |
| 8,025,045 | B2 * | 9/2011 | Pettersson | B60K 11/085 123/542 |
| 9,617,907 | B2 * | 4/2017 | Nam | F01P 7/16 |
| 9,920,718 | B2 * | 3/2018 | Nam | F02B 29/0412 |
| 10,008,164 | B2 * | 6/2018 | Du | G02F 1/13476 |
| 10,619,886 | B2 * | 4/2020 | Cermak | F24F 13/15 |
| 10,647,194 | B1 * | 5/2020 | Burtch | B60K 11/085 |
| 11,413,956 | B2 * | 8/2022 | Gerber | B60K 11/085 |
| 11,473,655 | B2 * | 10/2022 | Knauer | F16H 21/44 |
| 12,151,550 | B2 * | 11/2024 | Takita | B60K 11/085 |
| 2002/0112494 | A1 * | 8/2002 | Harth | B60K 11/085 62/239 |
| 2013/0025952 | A1 * | 1/2013 | Kitashiba | B60K 11/085 180/68.1 |
| 2013/0284401 | A1 * | 10/2013 | Kiener | B60K 11/085 165/98 |
| 2014/0170960 | A1 * | 6/2014 | Vacca | B60K 11/085 454/333 |
| 2018/0347449 | A1 * | 12/2018 | Clapie | F01P 11/10 |
| 2020/0391685 | A1 * | 12/2020 | Manhire | B60K 11/08 |
| 2021/0008953 | A1 * | 1/2021 | Gerber | F24F 13/1426 |
| 2022/0176810 | A1 * | 6/2022 | Müller | B60K 11/085 |
| 2022/0235605 | A1 * | 7/2022 | Teuscher | E06B 9/368 |
| 2022/0258597 | A1 * | 8/2022 | Schneider | B60R 19/52 |
| 2023/0406092 | A1 * | 12/2023 | Pütz | B60K 11/085 |
| 2023/0406419 | A1 * | 12/2023 | Maestre Serrano | B60K 11/085 |
| 2023/0415564 | A1 * | 12/2023 | Müller | F01P 7/10 |
| 2024/0123816 | A1 * | 4/2024 | Pütz | B60K 11/085 |

OTHER PUBLICATIONS

Int'l Preliminary Report on Patentability dated Dec. 9, 2022 in Int'l Application No. PCT/EP2021/080399.

* cited by examiner

AIR GUIDE CONTROL

CROSS-REFERENCE TO RELATED APPLICATIONS

This application is a Section 371 of International Application No PCT/EP2021/083099, filed Nov. 26, 2021, which was published in the English language on Jun. 2, 2022, under International Publication No. WO 2022/112471 A1, which claims priority under 35 U.S.C. § 119(b) to German Application No. 10 2020 131 530.9, filed Nov. 27, 2020 and German Application No. 20 2021 101 381.8, filed Mar. 18, 2021, the disclosures of each of which are incorporated herein by reference.

In the abstract, the invention relates to a device for thermal management of a motor vehicle power unit arranged in a flow direction downstream of an air opening closable by a flap arrangement, the flap arrangement controlling an air flow generated by a driving wind by the flap arrangement selectively opening and closing the air opening.

Specifically, the invention relates to an air guide control system insertable into or forming an air opening for controlling air flowing in along an air flow direction L, with a flap arrangement comprising a plurality of flaps arranged in the air opening in a louver-like manner relative to one another. Each flap having flap rotation axis extending along a flap longitudinal axis and a flap surface extending transversely to said flap rotation axis. Each flap surface is bounded by flap longitudinal sides extending parallel to the flap axis of rotation and flap end sides extending transverse to the flap axis of rotation. Usually, the longitudinal flap sides are several times longer than the transverse flap sides, so that the flap surface has a rectangular shape.

The flaps can be rotatably connected to a joining partner receiving or holding the flap arrangement by means of mutually spaced, parallel flap rotary axes to form the flap arrangement, each flap of the flap arrangement being adjustable by means of an adjusting device between an open position releasing the air opening and a closed position at least partially closing the air opening for selectively releasing and closing the air opening to implement thermal management of the motor vehicle unit, such as an internal combustion engine, a brake, but also electronic or electrical components, located downstream of the air opening in the direction of air flow L.

The drive unit rotates the flaps of the flap arrangement about their respective flap rotation axes arranged at a distance from one another. This drive unit, often also referred to as "actuator", is preferably designed as an electric motor.

The air opening can thus be selectively opened and closed by the flap arrangement as a function of the engine power and/or engine temperature by rotating the flaps around their respective flap rotation axis through different angles of rotation between the open position and the closed position. The air supply control is closed, for example, for faster heating of the engine during the starting phase, and the air supply control is opened under full load for better cooling of the engine.

The flap arrangement comprises a number of flaps arranged rotatably above or next to one another in the joining partner, in particular frame, which receives them, with a flap longitudinal axis extending transversely to the direction of travel. The flaps of the flap arrangement can thus be rotated from the closed position, in which the flap surfaces extend essentially transversely to the direction of travel, to an open position about their respective flap longitudinal axis, in which the flap surface extends completely or partially parallel to the direction of travel.

Such a flap arrangement is known, for example, from EP 2 855 185 B1.

DISADVANTAGES OF THE PRIOR ART

Legal regulations increasingly require the verifiability and display of defects in technical devices in motor vehicles. In the case of motor vehicles, this is often referred to as onboard diagnostics ("OBD"). This is a vehicle diagnostic system that monitors all systems affecting exhaust emissions while the vehicle is in operation. In addition, other important control units are provided whose data can be accessed through their software. Any faults that occur are indicated to the driver via an indicator lamp and permanently stored in the respective control unit. Error messages can then be queried later by a specialist workshop via standardized interfaces.

An air supply control system must therefore be included in this diagnostic system. In the case of louvre-type flaps with rotary axes extending parallel to one another, previous solutions provide for the detection of a flap defect, in particular a flap rupture, in two ways. On one hand directly on the flap driven by the actuator (driven flap), whereby the actuator detects the absence of the drive flap the fact that it exceeds a predefined angle of rotation. The other solution provides a stop for the flaps in the open position, whereby the actuator also detects the absence of a flap in this case by the fact that a rotation angle assigned to this stop is exceeded.

In existing air controls, breakage of a flap within a flap system is problematic because the flap arrangements have so far arranged the limit switches on the respective outer flaps dampers of a flap arrangement, i.e. only on the respective outer flap of the flap arrangement. This is not sufficient for the breakage of an "inner" flap, because this defect is not detected.

If an inner flap breaks in the open position, then the actuator can no longer move the flap arrangement to the closed position.

Task

It is the task of the invention to at least partially avoid the disadvantages of the prior art and, in particular, to provide a cost-effective and reliable air guidance control system.

In particular, reliable fault detection should also be possible for "inner" flaps in flap arrangements with more than two flaps.

Invention

The invention solves this problem by the features of the independent claims. Advantageous but not mandatory features are included in the dependent claims.

Abstractly speaking, the air guide control system according to the invention is designed in such a way that the entire flap arrangement, i.e. the kinematic system formed by the latter, can be locked in motion by the spring in the event of a defect of at least one flap at the locking end.

Such an airflow control system located in or behind the radiator grille of a motor vehicle is sometimes referred to as an "active grille shutter" because it is located at the front end of a motor vehicle immediately behind or integrated into a radiator grille or radiator grille of a motor vehicle. However, the concept can be applied not only to the thermal management of an internal combustion engine, but also to brakes, electrical assemblies, and other motor vehicle assemblies or subassemblies that require controlled thermal management.

The concept for detecting at least one missing flap of a flap arrangement or a flap system with more than two flaps, which in particular has at least one "inner" flap, comprises a spring which is designed in such a way that when a referenced position, preferably an open position, is passed, the remaining flaps or the coupling rod are/is blocked by a spring section, in particular a spring tongue of the spring, so that the actuator is prevented from moving on, i.e. the entire flap arrangement is blocked. The actuator detects this blockage through its OBD function and reports an error to the control unit. The remaining flaps of the flap arrangement are thus prevented by the spring from moving further into the closed position. This always ensures that the units downstream of the flap arrangement can be supplied with sufficient fresh air at all times. In the context of the invention, this is referred to as the "fail-safe position", i.e. an at least partially open position of the flap arrangement.

The flap arrangement is preferably designed such that the spring is held in a preloaded deflection position by the flaps and, in the event of a flap fracture of at least one flap, emerges from this preloaded deflection position and locks the flap arrangement against further movement.

In particular, this task is solved in that each flap of the flap arrangement is designed as a drive end on one flap end face. For this purpose, each flap has on this flap end face a lever arm acting on the flap axis of rotation, which can be rotatably connected to a coupling rod. In addition, each flap of the flap arrangement is designed as a locking end on one flap end face. For this purpose, the flap arrangement comprises at least one spring at the locking end, which spring is arranged between the flaps and the joining partner and is arranged or seated with a resilient spring end under deflection by the flaps between the joining partner and at least one of the flaps, so that in the event of a flap fracture of at least one flap of the flap arrangement, this spring causes the flap arrangement to be locked, in that the spring end springs out of the prestressed position and locks the entire flap arrangement, that is to say the kinematic system defined thereby, against further movement. According to the invention, the spring therefore only has to include one spring end.

This design ensures that in the event of a defect in at least one flap of the flap arrangement, e.g. a break in an inner flap of the flap arrangement, the spring emerges from the deflected position, which deflects and thus tensions the spring end of the spring, e.g. from a recess or trough accommodating the spring end, and locks the flap arrangement, for which purpose it engages in particular in a spring recess which is designed such that the spring end can engage in this recess. This triggers feedback to the actuator via the coupling rod and the directly driven flap and thus the error message desired by the diagnostic system. It should be noted that the spring recess in the flap arrangement is not absolutely necessary for the engagement of the spring end. It is therefore also possible for the spring to lock the flap system simply by contact, e.g. by contact against the coupling rod or against a flap in the deflected, relaxed position.

The design according to the invention thus realizes a detection of more than two missing flaps in a flap arrangement by the actuator, because the locking of at least one flap, in particular also of an inner flap, or of the coupling rod realized by the at least one spring tongue is transmitted via the coupling rod to the drive flap driven by the actuator.

Assembly is simpler and the kinematics less prone to error if at least the resilient end of the spring is seated in a correspondingly formed spring recess or spring trough in the mating partner. This design ensures in particular that the resilient spring end is flush or flat with a surface of the mating partner enclosing the recess.

Embodiments provide for the formation of a not necessarily resilient fastening end on the spring, with which the spring can be connected to the joining partner. The fastening end can thus be fixed rigidly or with little resilience to the joining partner. Thus, a preferred embodiment of the spring has a fastening section for fastening to the joining partner and at least one, preferably several, spring ends formed on this fastening section.

Particularly preferably, these resilient spring ends are located in corresponding spring recesses or spring troughs, in which the spring ends are pressed by the adjacent flap into the joining partner receiving the spring ends.

The spring can be latched or screwed to the joining partner, but does not necessarily have to be connected to the joining partner.

The spring can therefore also only be clamped between the joining partners. For example, it is possible that the spring or its at least one spring end is clamped between the joining partners due to its spring clamping, e.g. formed in a spring trough for aligning reception of the spring on the joining partner.

Preferably, the proposed system may be designed such that at least one broken flap is additionally selectively pushed by the spring tongue out of a bearing position receiving it to enable accurate defect detection.

The air guidance control system is also designed in such a way that, in the absence of at least one flap, the actuator remains in a "fail-safe position", which means that the "residual flaps" remain at least partially open, so that units located downstream of the air opening in the direction of flow can always be supplied with sufficient air.

The solution according to the invention can be applied to air guidance controls of any size, i.e. it is not limited to flap arrangements with two or three flaps, but can also be extended and scaled to any number and size of flaps. The preferred embodiment comprises a damper arrangement with three dampers, with two outer dampers, thus bordered by only one other damper of the damper arrangement, and an "inner" damper, thus bordered by two dampers of the damper arrangement. However, this flap arrangement may also comprise several "inner" flaps.

Preferably, a flap, in particular an outer flap, is designed to be driven directly by an adjusting device, also referred to as an "actuator", and is particularly preferably designed as an electric motor. This driven flap preferably comprises a drive pin which can be connected to the adjusting device in a rotationally fixed manner, in particular which can be inserted into it. The coupling rod and the lever arms then transmit the torque synchronously to the other flaps of the flap arrangement.

In embodiments, the spring recess is designed for engagement of a spring end of the spring in the event of flap breakage of at least one flap on the coupling rod. The spring end is to be understood as a movable part of the spring. Preferably, this spring recess is designed as a recess or notch adapted to the spring end, in which the spring end rests or is pressed in by the flap or also engages. In this design, the driving end and the locking end can be formed at the same end face of the flap arrangement, which enables ab particularly compact design.

In one embodiment of the air guide control, the flaps of the flap assembly each have, at the locking end, a flap end disk extending transversely to the axis of flap rotation, each flap end disk defining a flap end disk surface and each flap end disk including a segmental spring recess configured to engage the spring end of the spring.

Preferably, this flap end plate is formed as a disc or plate extending transversely to the flap axis of rotation at the flap end face of the locking end of the flaps, which is preferably formed integrally on the flaps. Particularly preferably, the flap end plate has a circular geometry in the side view of the flap along the flap axis of rotation. In the installed position, this flap end plate thus lies on the inside laterally against the joining partner for receiving the flap arrangement and presses the at least one spring end of the spring either only against the joining partner or preferably into a trough-shaped spring recess for the spring end. Only when a flap breaks and at least one flap possibly falls out does the spring end emerge from the deflected position in the spring recess due to the spring force and engage in the spring recess on the flap arrangement to lock it against further movement.

In the preferred embodiment, flap end discs are provided on both flap end faces of the flap surface, in particular formed integrally thereon, e.g. by injection molding.

In a preferred embodiment, the joining partner for receiving the flap arrangement is designed as a frame, in particular a circumferentially closed frame, which is designed to receive or rotatably insert the flap arrangement and thus forms an "air guide control frame".

Preferably, the frame has longitudinal webs extending at a distance from one another and transverse webs connecting them, i.e. extending between them. These longitudinal webs are provided with flap openings arranged coaxially in pairs at defined flap rotary axis spacing, into which cylindrical flap pins or pins of the flaps can be inserted or through which an axis connectable to the flaps can be inserted.

In the preferred embodiment, the flaps have cylindrical flap pins extending from the flap end faces or the flap end discs along the axis of rotation of the flap, which can be inserted rotatably into the corresponding flap openings of the joining partner, in particular of the frame, and are particularly preferably designed to snap in. Preferably, these flap pins are formed in one piece on the flaps, e.g. molded on.

Particularly preferably, the flap pins, which extend with their cylindrical surface around the axis of rotation of the flap, are integrally formed on both sides of the flap end faces and can be inserted rotatably into the corresponding flap opening of the frame or another joining partner, particularly preferably in such a way that they can be snapped in. The cylindrical surface of the flap pins, which projects laterally from the end face of the flap, thus encloses the axis of rotation of the flap.

The joining partner for rotatably receiving the flaps thus has bearing points, in particular bearing holes or bearing bushes for rotatably receiving the flap pins of the flaps. This frame can thus be designed as a prefabricated assembly with the flap arrangement, i.e. the flaps rotatably inserted in the frame, and the actuator. This assembly can then be installed in the motor vehicle, for example in a corresponding opening behind the radiator grille or the air intake opening at the front end of the motor vehicle. Particularly preferably, this is designed to engage without tools, e.g. by means of complementary latching tabs and surfaces which engage behind each other in the installation position on the joining partners.

Thus, the frame can be converted to the frame component of a larger assembly or can be assembled into it, e.g. a holding frame with an opening arranged in a matrix-like manner, into which the frames with the flap arrangement, i.e. the air guide control frames, can be inserted.

In a particularly easy-to-assemble embodiment of such an assembly, especially the frame, this is of multi-part, especially two-part design. Thus, the flaps of the flap assembly can be inserted with the flap pins into one half shell and then the second half shell is placed on top, e.g. snapped on, clipped or screwed on, so that the flap pins are rotatably received in the bearing shells formed by the two half shells. Preferably, therefore, the frames are formed by two or more frame parts that can be connected to one another, in particular frame half-shells with bearing points into which the flaps with the flap pins can be rotatably inserted.

For example, the receiving frame may comprise a clip bearing, i.e. a plate or cover which can be connected to the frame and which, when installed with the frame, forms the bearing points for the flaps.

Particularly preferably, the frame thus comprises a flap area in which the plurality of flaps are rotatably inserted to form the flap arrangement and, laterally thereof, the actuator which drives at least one flap of the flaps, preferably a drive pin of a driven flap.

In a preferred embodiment, the spring is designed in such a way that it always locks the flap adjacent to a defective flap, i.e. blocks it against further rotation.

Preferably, the spring is designed as a rectangular, elongated leaf spring extending along a longitudinal spring axis and along a transverse spring axis extending transversely to the longitudinal spring axis. The leaf spring is several times longer along the longitudinal axis than along the transverse axis, preferably about 20 to 30 times longer than wider. This ensures that this leaf spring, extending transversely laterally, can be inserted in the inner side of the vertical strut of the joining partner or frame and, when a central flap of the flap arrangement falls out, locks the respective adjacent flap in place. The length of the spring should therefore be at least long enough to be slightly longer than the clear distance between two adjacent axes of rotation of the flaps of a flap arrangement.

Another embodiment likewise provides for the design of the spring as a flat spring or leaf spring, which has a longitudinal leg at one end forming the fastening end and preferably extending along a longitudinal axis of the spring. At least two, preferably as many, resilient spring legs as there are flaps in the flap arrangement are provided on this longitudinal leg extending transversely to this longitudinal axis of the spring and spaced apart from one another at the distance of the clear distance between the axes of rotation of the flap arrangement. The fastening end, i.e. the longitudinal leg, is connected in the installed position to the joining partner, i.e. preferably to the frame, and does not necessarily have to be of resilient design.

The resilient spring legs lock a locking partner of the flap arrangement, in particular a flap or a coupling rod, and preferably engage in spring recesses formed correspondingly on the locking or joining partner, preferably formed as troughs for the spring legs adapted to the geometry of the spring legs, referred to here as spring troughs, in which these are held by the adjacent flaps, in particular by the flap end plates of the flap arrangement, i.e. are deflected and prestressed.

In the event of a defect of at least one flap, in particular the flap falling out of the flap arrangement, e.g. caused by the breakage of a flap, the deployed or deflected spring leg springs back due to the then missing adjacent flap, in particular the flap end plate, and then locks the flap of the flap arrangement adjacent to the missing flap.

In a flap arrangement with three flaps, the spring thus has essentially the geometry of a letter "E" in the front view, in which the longitudinal leg, which is not necessarily spring-loaded, extends along a longitudinal axis of the spring and from which the spring legs extend transversely to the longitudinal axis of the spring, extending parallel to one another.

In this embodiment, too, all the flaps of the flap arrangement are locked in the event of a defect in at least one flap and are thus reported to the diagnostic system as a fault.

Preferably, the air guide control forms part of or is insertable into a radiator grille.

Larger units can be realized by combining several assemblies, comprising frames with flap arrangements and corresponding actuators, in a modular way to form a larger overall system.

It is particularly preferred that the flap arrangement be made of plastic, because these parts can be manufactured particularly easily in large quantities, especially preferably by plastic injection molding.

In addition, the invention relates to a radiator grille or an assembly for a radiator grille, comprising a frame with a flap arrangement rotatably received in this frame, comprising a plurality of flaps arranged in a louver-like manner in relation to one another.

The assembly can also be designed to accommodate the electric motor therein, which is preferably designed as an actuator.

Preferred embodiments of the invention are illustrated by way of example in the following figures.

Further features and advantages of the present invention will become clear from the following figure description of preferred embodiments with reference to the accompanying figures. In this regard, directional terminology such as "top", "bottom", "front", "rear", "front", "rear", etc. is used with reference to the orientation of the figure(s) described. Since components of embodiments may be positioned in a number of different orientations, the directional terminology is for illustrative purposes and is not limiting in any way. It is understood that other embodiments may be used and structural or logical changes may be made without departing from the scope of protection of the present invention. The following detailed description is not to be construed in a limiting sense. In the context of this description, the terms "connected", "connected" as well as "integrated" are used to describe both a direct and an indirect connection, a direct or indirect connection as well as a direct or indirect integration. In the figures, identical or similar elements are given identical reference signs where appropriate. The representations in the figures are essentially to scale. However, in order to illustrate details, certain areas may be shown in an exaggerated size recognizable to those skilled in the art. In addition, the drawings may be strikingly simplified and do not include every detail that may be present in the practical embodiment. Unless otherwise indicated, the indefinite article and definite article refer not only to a single component, but are to be understood as "at least one". The terminology includes the previously mentioned words, variations thereof, and similar meanings. Further, it should be understood that the terms "about," "substantially," and similar terms in connection with the dimensions and a property of a component of the invention do not describe the described dimension and property as a strict limit or parameter and do not exclude minor variations thereof which are functionally similar. At a minimum, descriptive parts with numerical parameters also include variations of those parameters in accordance with prior art mathematical and manufacturing principles, e.g., rounding, deviations and other systematic errors, manufacturing tolerances, etc.

Finally, in the case of several identical components or elements, for reasons of clarity only one reference sign is given in each case.

All features of the respective embodiments are also disclosed independently of each other in general within the scope of the invention. Identical reference numerals in the figures refer to identical components or features.

These show.

Figure 1:
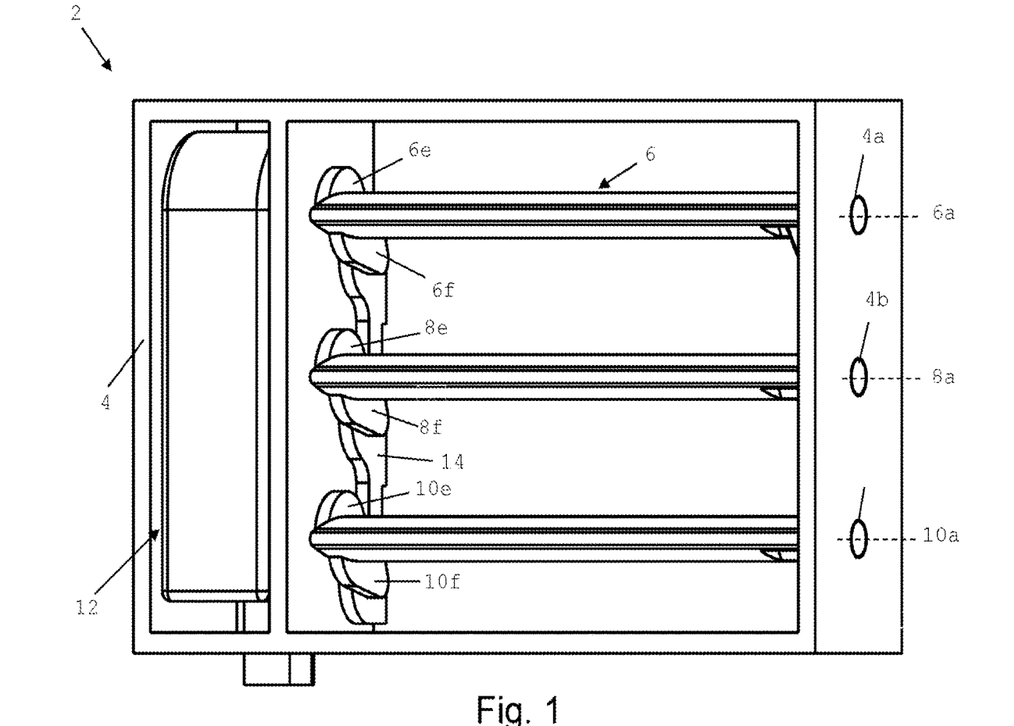
FIG. 1 an isometric front view from the right of a first embodiment of an air guide control designed as an air guide control frame with the flap arrangement open.

FIG. 1 shows an isometric view of the first embodiment of the air guiding device designed as an air guiding control frame 2, which in the present case is made of plastic parts and essentially comprises the surrounding frame 4, a flap arrangement comprising three flaps 6 arranged parallel to one another and an actuator 12 also accommodated in the frame 4.

The frame 4 is of substantially box-like, rectangular construction and comprises two longitudinal frame members spaced parallel to each other along the length of the flaps 6, 8, 10 and connected by transverse frame members extending transversely to the longitudinal axis of these longitudinal frame members.

On the left-hand side, these frame transverse legs extend parallel to the flap pivot axes 6*a*, 8*a*, 10*a* further outwards over the longitudinal frame leg on the left-hand side in the figures, where they form a further box-like section in which an actuator 12 is inserted.

Thus, the three flaps 6 forming a flap arrangement as well as the actuator 12 are accommodated together in the frame 4 that accommodates them and form an assembly that can be further installed.

Each flap comprises a flap pivot axis 6*a* extending along a flap longitudinal axis, on which a wing-like curved flap surface 6*b* is formed, which is bounded by two flap longitudinal sides spaced apart from one another in the flap longitudinal direction and extending parallel to one another, and by flap end sides bounding these at the end faces. Along the flap rotation axis 6*a*, flap pins 6*c*, 6*d* extend around this from the flap end faces respectively, which thus project from the flap end faces and engage in corresponding flap openings 4*a*, 4*b*, 4*c* in the frame 4.

In the first embodiment shown in FIGS. 1 to 4, the flaps 6 each have, at the front end facing the actuator 12 in the installed position, a substantially circular flap end plate 6e extending transversely to the flap axis of rotation 6a, which therefore extends transversely to the flap surface 6b. Furthermore, a flap arm 6f forming a lever arm is provided projecting radially on one side from the respective flap axis of rotation 6a, laterally offset from the flap axes of rotation 6a arranged one above the other, and having a pin projecting outwards towards the frame 4 in the installed position. Each of these flap arms 6f with the corresponding pin is rotatably connectable or connected to a coupling rod 14. The rod-shaped, elongated coupling rod 14 is thus rotatably connected at the drive end to all flaps 6 of the flap arrangement, so that the rotation of the drive pin 6g, which is driven by the actuator 12 and is of star-shaped design in the present case, is transmitted synchronously to the other flaps 6 of the flap arrangement and the flaps 6 thus rotate about their respective flap rotation axes 6a.

This front end of the flaps 6 formed with the flap arm 6f represents the drive end of the flaps 6.

In the first embodiment shown in FIGS. 1 to 4, the locking end is formed at the opposite flap end, at which a flap end disk 6h is also formed, which in each case extends with its flap end disk surface likewise transversely to the flap surface 6b and from which the flap pin 6d projects outwardly extending along the flap axis of rotation 6a. However, this flap end plate 6h is not formed entirely as a closed circular surface, but has a segment- or pie-shaped recess 6i which takes up about a quarter of the flap end plate surface.

In the first embodiment, a leaf spring 16 forming the locking device is inserted in the longitudinal leg of the frame at the end of the flaps 6 opposite the drive end. This leaf spring 16 comprises a fastening end 16a extending in the longitudinal direction of the spring, from which two resilient spring ends 16b, 16c extend at an angle of about 50 to 60° to the horizontal, which also spring upwards or forwards out of the plane of the fastening end 16a. In the installed position, these spring tongues 16b, 16c are seated in correspondingly formed spring recesses 4d, 4e, which are provided in a trough-like configuration on the inner surface of the frame longitudinal legs, which are thus adapted to the size of the spring tongue 16b, 16c, so that the spring tongue 16b, 16c are thus pressed into these spring recesses 4d, 4e by the abutting flap end faces 6h of the flap 6.

Figure 2:
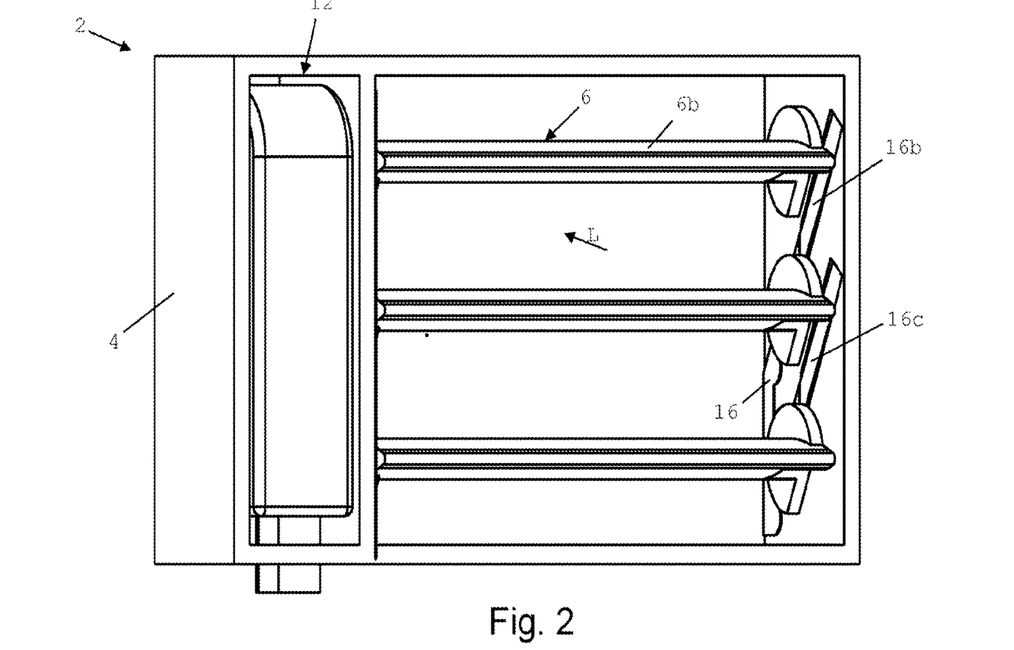
FIG. 2 an isometric front view of the embodiment according to FIG. 1 from the left.
Figure 3:
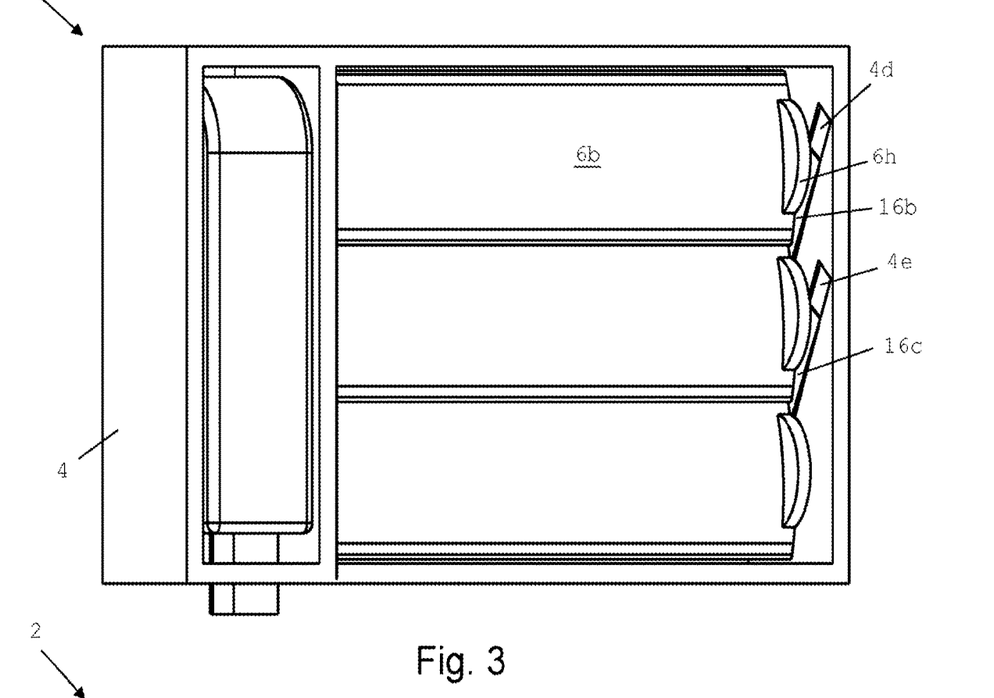
FIG. 3 is an isometric front view of the embodiment according to FIG. 1 with the flap arrangement closed.

FIGS. 1 and 2 show the flap arrangement with the flaps 6 in the open position, in which the longitudinal sides of the flap surfaces 6b thus extend transversely to the air opening formed by the frame 4, so that the air can pass through this air opening and reach the unit of the motor vehicle located downstream in the direction of flow L.

In this position, it can be clearly seen in particular in FIG. 2 how the flap surfaces 6b and the end flap surface 6h press the spring tongues 16b, 16c of the leaf spring into the corresponding spring recesses 4d, 4e and hold them there, thus preventing these spring arms 16b, 16c from springing out. This also applies when the flaps are rotated through 90° from the open position shown in FIGS. 1 and 2 to the closed position shown in FIG. 3, in which the flap surfaces 6b completely close the air opening. Also in this position, the flap end plate 6h continues to press the spring arms 6b, 6c into the corresponding spring recesses 4d, 4e.

Figure 4:
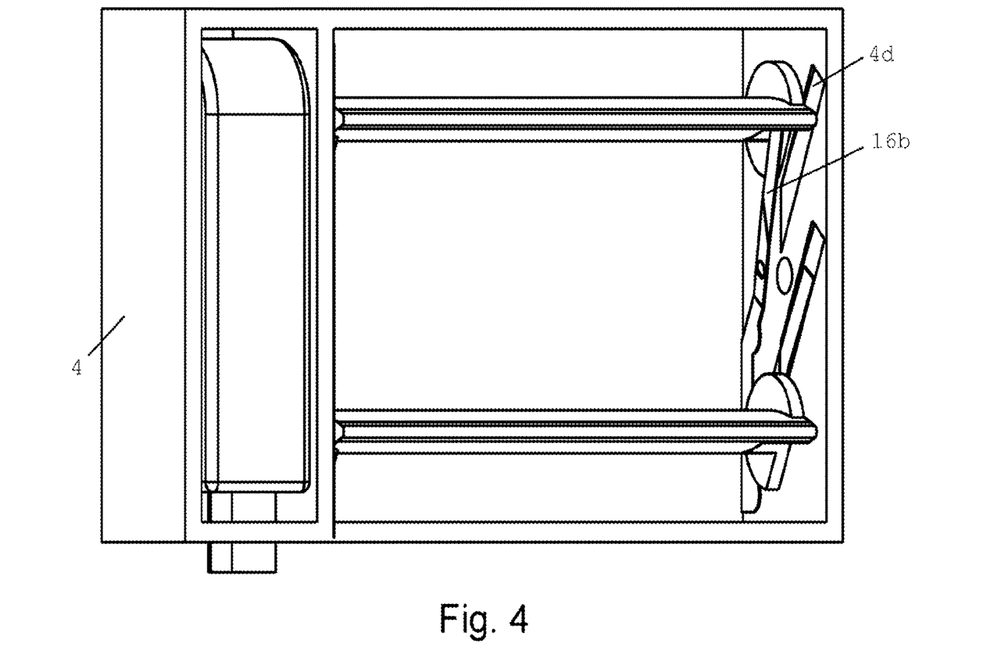
FIG. 4 the isometric front view of the embodiment according to FIG. 3 with the flap arrangement open and the center flap removed.

Only in the case of the flap fracture shown in FIG. 4, in which, for example, the middle flap is broken and has thus fallen out of the flap arrangement, can the spring arm 16b emerge from the depressed position from the spring recess 4d because of the missing flap end plate 6h of the middle flap. When the upper flap 6 is rotated, the upper spring arm 16b then engages under the flap surfaces 6b of this upper flap 6, which is realized by the spring recess 6i in the flap end disk 6h. This embodiment thus makes it possible for a flap break of a middle flap 6 to also be transmitted to the actuator 12 by means of the coupling rod 14, i.e. not of a flap arranged at the outer end of a flap arrangement.

Figure 5:
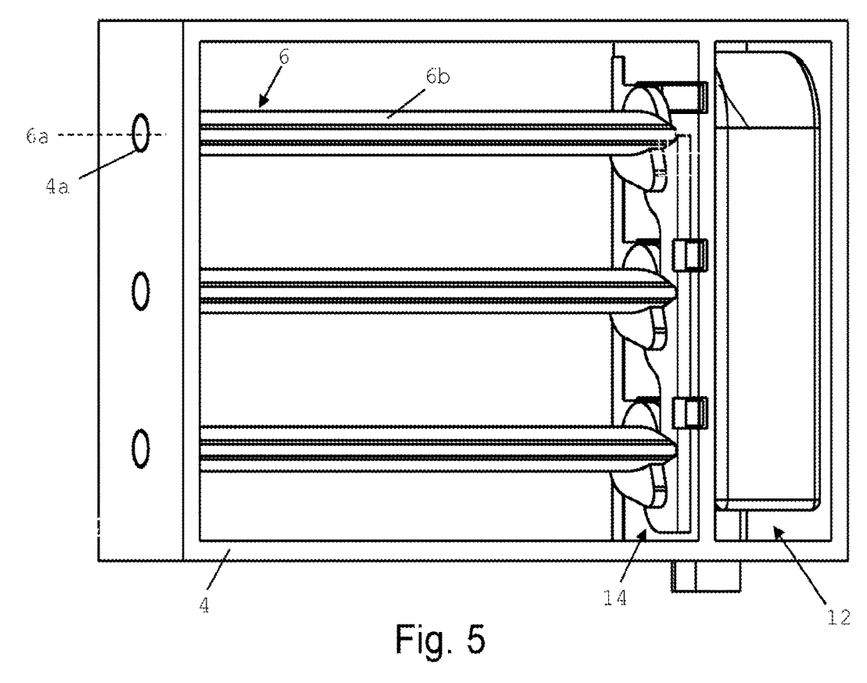
FIG. 5 an isometric front view from the left of a second embodiment of the air guide control frame with the flap assembly open.
Figure 6:
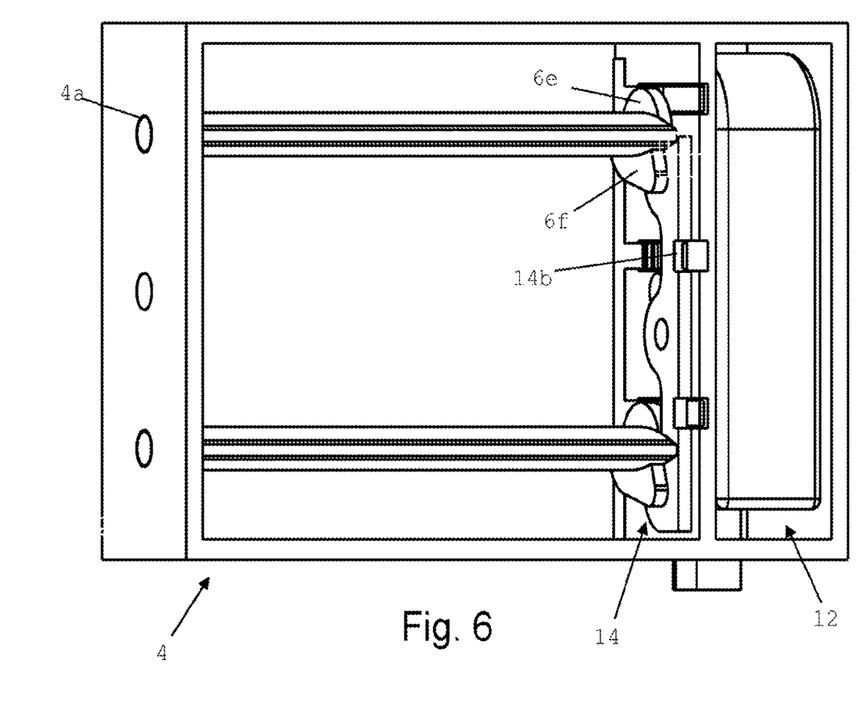
FIG. 6 an isometric front view of the second embodiment according to FIG. 5 with the central flap missing.
Figure 7:
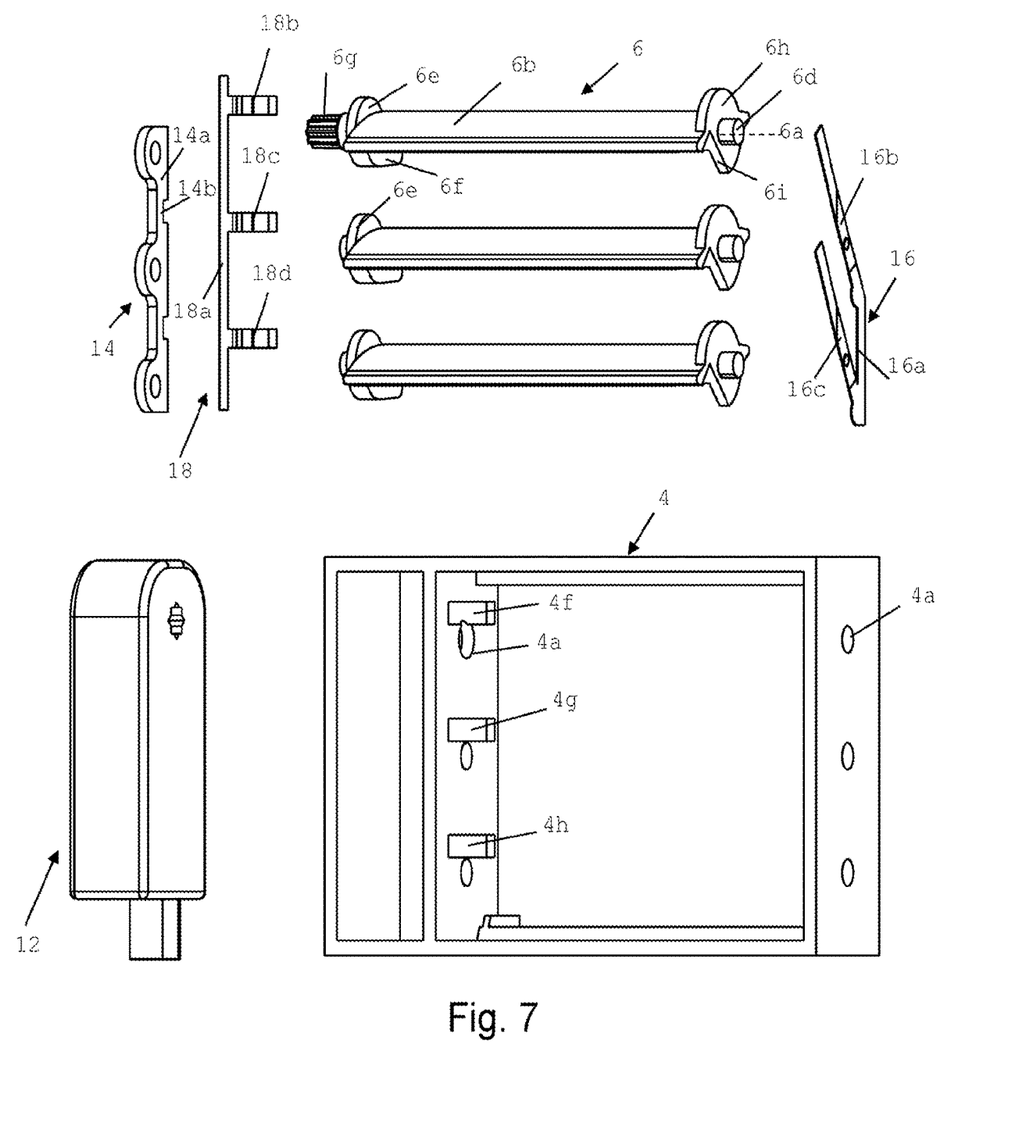
FIG. 7 an exploded view of all components of both embodiments of the air guide control frames according to both embodiments.

The second embodiment shown in FIGS. 5 to 7 differs from the first embodiment shown in FIGS. 1 to 4 in that the driving side and the locking side are arranged on the same side directly adjacent to the actuator 12, which makes the structure even more compact. To this end, the coupling rod 14 has a plurality of spring recesses 14b which cooperate with arm-shaped spring tongues 18b, 18c, 18d of the alternatively formed spring 18. This spring 18 also has a fastening end 18a extending substantially along the longitudinal axis of the spring, which is fixed along the longitudinal web of the frame 4 on the inside thereof, and wherein the resilient spring arms 18b, 18c, 18d are formed on this fastening end 18a extending transversely to the longitudinal axis thereof, which spring arms also spring upwards out of the plane of the fastening end 18a. In the installed position, these spring arms 18b, 18c, 18d engage in correspondingly formed spring recesses 4f, 4g, 4h, each of which is formed just above the flap opening 4a in the frame 4 on the side facing the flap arrangement. Thus, the spring arms 18b, 18c, 18d are seated in these spring recesses 4f, 4g, 4h when the flaps 6 of the flap arrangement are inserted in the frame. If a flap fracture of the middle flap occurs, as this is shown in FIG. 6, the spring arm 18c associated with this flap is no longer held in the spring recess 4g by the flap end plate 6e, so that the spring protrudes inwards from the spring recess 4g and engages in the corresponding spring recess 14b of the coupling rod 14, thus preventing its movement.

Figure 8:
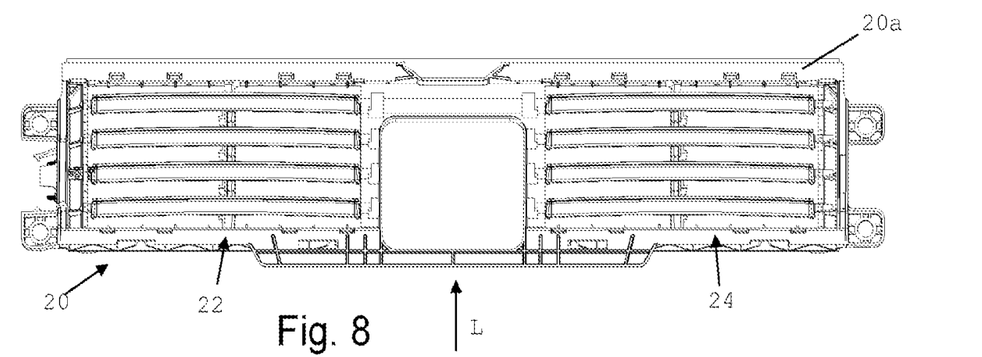
FIG. 8 a front view of an air control frame comprising two flap assemblies.

FIG. 8 shows a front view of a frame designed as an air guide control frame 20 with two flap arrangements 22, 24 arranged in lateral air openings and a central through window.

The flap arrangement comprises 4 flaps 28 arranged one above the other in the installation position with horizontal flap rotation axis, of which the uppermost flap 28 in the figure is designed as a drive flap and can be driven by an actuator not shown.

The flaps 28 of the flap arrangements 22, 24 are rotatably connected to a respective flap arm 28f of the flaps 28 via a laterally arranged coupling rod 30 in order to thus move all flaps 28 synchronously when the drive flap is driven.

In this embodiment, therefore, the drive end and the locking end are formed on the same side for a particularly compact design, although this does not necessarily have to be the case.

The flaps 28 are again seated with their flap pins 28g projecting along the axis of rotation of the flaps at the front ends so as to be rotatably movable in the air control frame in particular in correspondingly designed bearing bushes of the air control frame 20.

In the present embodiment, the air control frame 20 has a multi-part design and comprises a main frame 20a on the underside in the figures, into which the flap pivots are inserted and on the upper side of which a complementary flat clip bearing 20b is snapped on, e.g. clipped in, which forms the other part or complementary part of the air control frame and the bearing bushes and thus, together with the main frame 20a, accommodates the bearing pivots of the flaps 28 in a rotatable manner. This multi-part, here two-part, design of the air control frame 20 allows for particularly easy assembly and maintenance of the flaps 28, for example in the event of a flap fracture of an inner flap.

Figure 9:
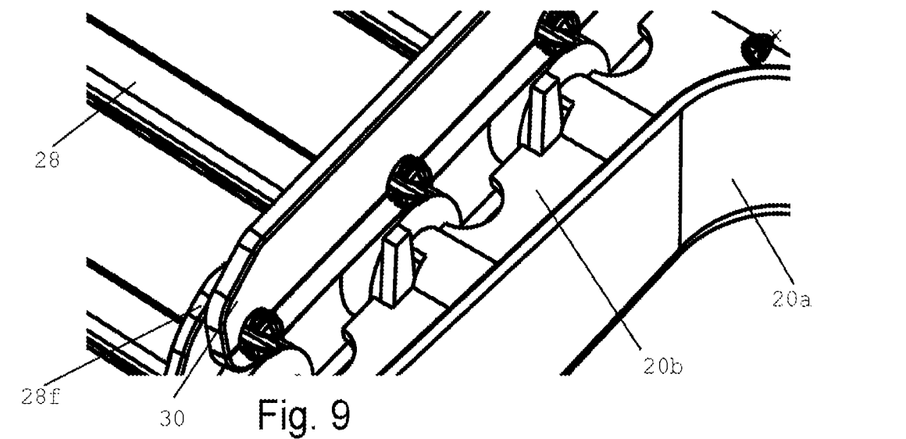
FIG. 9 an enlarged isometric top view of the right-hand end of the air control frame shown in FIG. 8 in the unblocked free-running position.
Figure 10:
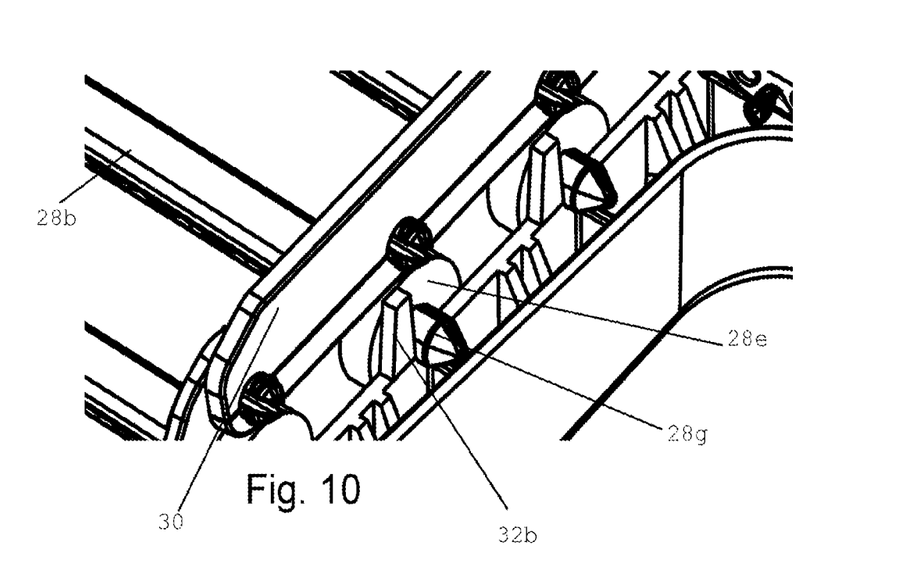
FIG. 10 the view according to FIG. 9 with the clip bearing removed.

In FIGS. 9 and 10, the damper assembly 24 is shown in normal operation, thus the spring tongues 32b of the spring connected internally to the air control frame 20 are held under preload in corresponding spring recesses of the air control frame 20 by the damper end plates 28e of the dampers 28, and wherein in the present case the spring recess is partially formed in the main frame 20a and the clip bearing 20b.

Figure 11:
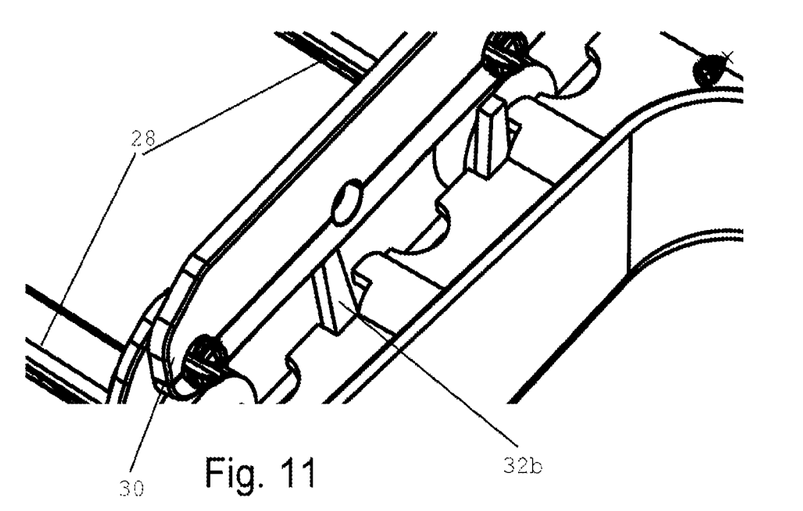
FIG. 11 the view shown in FIG. 9 with the clip bearing installed and the coupling rod locked.

FIG. 11 shows an isometric top view of a flap break, i.e. a missing inner flap, which was arranged between the two adjacent flaps 28. In this case, the flap is missing and thus the contact force against the spring tongue 32b is missing, which thus emerges from the corresponding spring recess due to the spring force, i.e. is deflected and then rests against the end face of the coupling rod 30, thus blocking it against further movement. This design has the advantage that the coupling rod serves as a contact surface along the entire end-face contact surface facing the front end face of the spring tongues 32b, so that no recesses need to be provided for the spring tongues 32b.

The subject matter of the present invention results not only from the subject matter of the individual claims, but from the combination of the individual claims with each other.

All details and features disclosed in the documents—including the summary —, in particular the spatial configuration shown in the drawings, are claimed to be essential to the invention insofar as they are new, individually or in combination, compared to the prior art.

LIST OF REFERENCE SIGNS 2 air guidance control frame
4 frame
4a, 4b, 4c flap opening
4d, 4e spring recess
6 flap
6a axis of rotation
6b flap surface
6c, 6d flap pins
6e flap faceplate
6f valve arm
6g drive pin
6h flap faceplate
6i spring recess
12 Actuator
14 coupling rod
14b spring recess
16 spring
16a Longitudinal leg
16b, c, d spring tongue
18 spring
18a longitudinal leg
18b, c, d spring tongue
20 air guidance control frame
20a main frame
20b clip bearing
22, 24 flap arrangement
26 Passage window
28 flap
28b flap area
28e flap faceplate
28f flap arm
28g flap pin
30 coupling rod
32b spring tongue

The invention claimed is:

1. An air guide controller insertable into or forming an air opening for controlling air flowing in along an air flow direction, having
   a flap arrangement comprising a plurality of flaps insertable into the air opening and arranged in a louver-like manner in relation to one another,
   wherein each flap comprises a square or rectangular flap surface (6b) extending along a flap axis of rotation, a square or rectangular flap surface extending transversely to the axis of rotation, the square or rectangular flap surface being bounded by flap longitudinal sides extending parallel to the flap axis of rotation and flap end sides extending transversely to the flap axis of rotation,
   wherein the flaps of the flap arrangement can be inserted along the flap axis of rotation at a first flap end face and an opposite, second flap end face, each in a relatively movable manner, in particular rotatably, into a joining partner,
   wherein each flap of the flap arrangement is adjustable by means of an adjustment device between an open position releasing the air opening and a closed position at least partially closing the air opening for selectively releasing and closing the air opening for realizing a thermal management of a motor vehicle arrangement downstream of the air opening in the air flow direction,
   wherein
   each flap of the flap arrangement is designed as a drive end at a flap end face,
   for which purpose each flap has, at this flap end face, a lever arm which acts on the flap axis of rotation and can be rotatably connected to a coupling rod,
   wherein each flap of the flap assembly is formed as a locking on one flap face, for which at least one spring is provided between a flap and the joining partner, which is seated with at least one resilient spring tongue, under deflection by the flaps and against the spring force of the spring tongue, between at least one flap and the joining partner in such a manner that, in the event of a flap fracture of at least one flap of the flap arrangement, this spring tongue causes the flap arrangement to be locked.

2. An Air guide control of claim 1, wherein the spring tongue is seated in a spring recess for deflectably receiving the spring tongue in the mating partner.

3. An air guide control of claim 1, wherein the spring comprises an attachment end connectable to the joining partner.

4. An air guide control of claim 1, wherein the spring comprises a plurality of separate spring tongues.

5. An air guide control according to claim 1, wherein at least one spring tongue is formed to lock the coupling rod.

6. An air guide control of claim 1, wherein the spring effects the locking by engagement of at least one spring tongue with a spring recess.

7. An air guide control of claim 6, wherein the spring tongue of the spring engages a spring recess on the coupling rod.

8. An air guide control according to claim 1, wherein the driving end is formed at a first flap end face and the locking end is formed at the second flap end face opposite to said first flap end face.

9. An air guide control according to claim 1, wherein the flaps of the flap assembly each have at the locking end a flap end disk extending transversely to the axis of flap rotation, each defining a flap end disk surface and comprising a segmental spring recess formed to engage the spring tongue of the spring.

10. An Air guide control according to claim 1, wherein the joining partner is formed as a circumferentially closed frame in which the flaps of the flap arrangement are rotatably receivable.

11. Air guide control according to claim 10, wherein the adjusting device is also arranged in the frame.

12. An Air guide control according to claim 1, wherein the spring is formed as a flat or leaf spring extending along a longitudinal spring axis as well as along a transverse spring axis extending transversely to the longitudinal spring axis, and wherein the leaf spring is formed to be several times longer along the longitudinal spring axis than along the transverse spring axis.

13. An air guide control of claim 12, wherein the spring has a longitudinal leg forming the attachment end and extending along a longitudinal axis of the spring, and wherein at least one resilient spring tongue is formed extending transversely of the longitudinal leg.

14. An air guide control according to claim 1, wherein flap pivots extending along the flap rotation axis are formed on the flap faces.

15. An air guide control according to claim 1, wherein it is formed as part of or insertable into a radiator grille.

16. An air guide control according to claim 1, wherein it is made of plastic.

17. A radiator grille comprising at least one guide control according to claim 1.

* * * * *